June 15, 1954
J. N. REED
2,680,945
COMBINED MOWER AND TRIMMER
Filed July 21, 1950
2 Sheets-Sheet 1
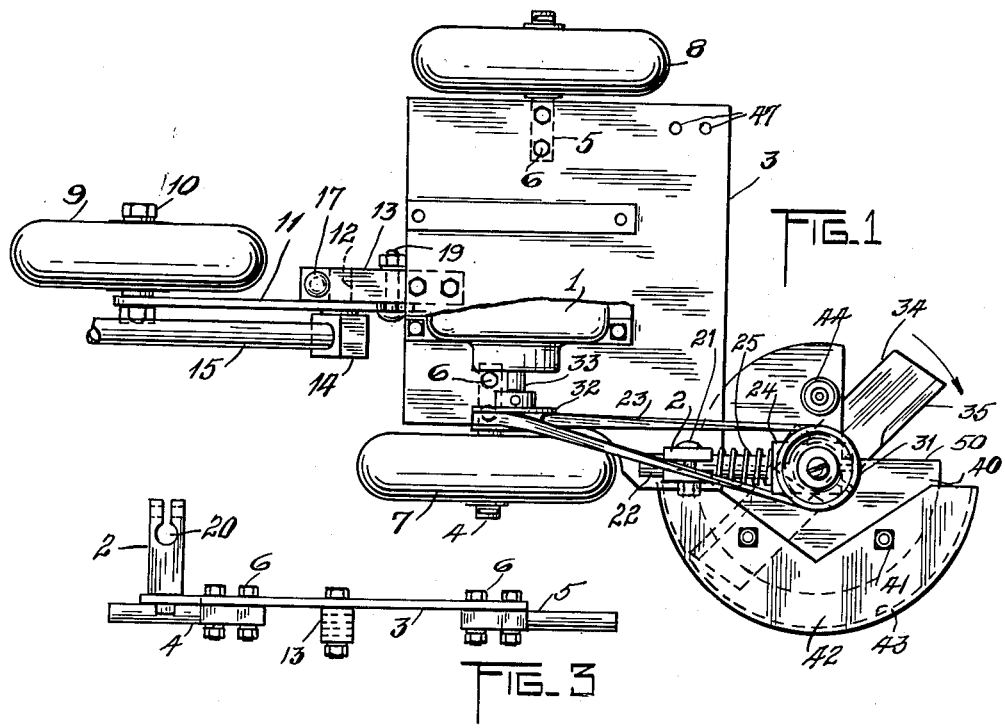
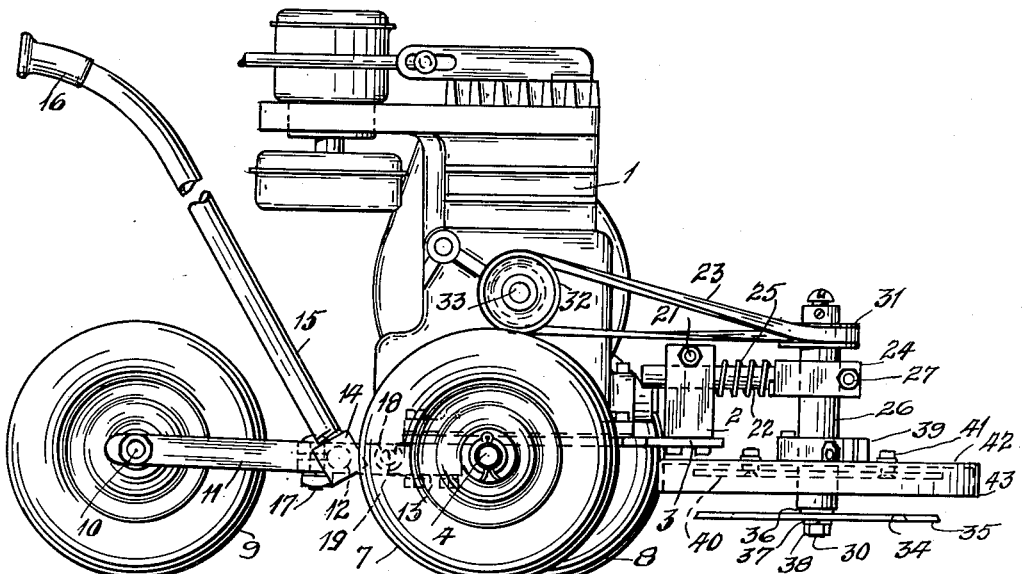
INVENTOR.
John N. Reed
BY
Attorney

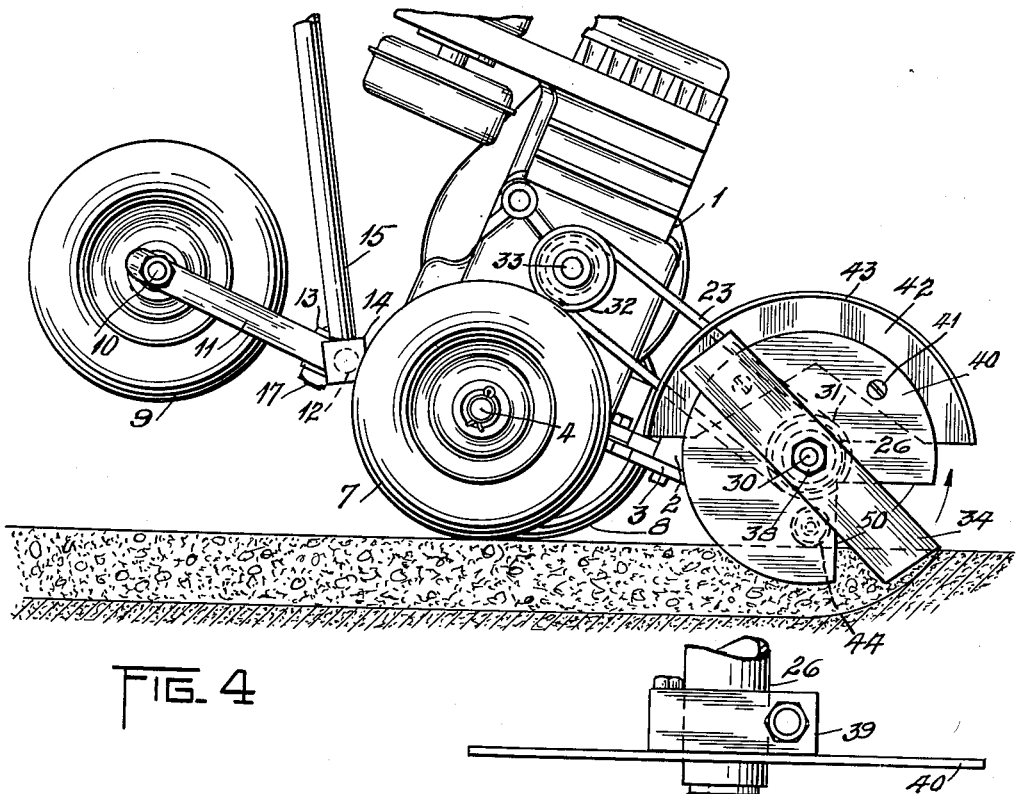
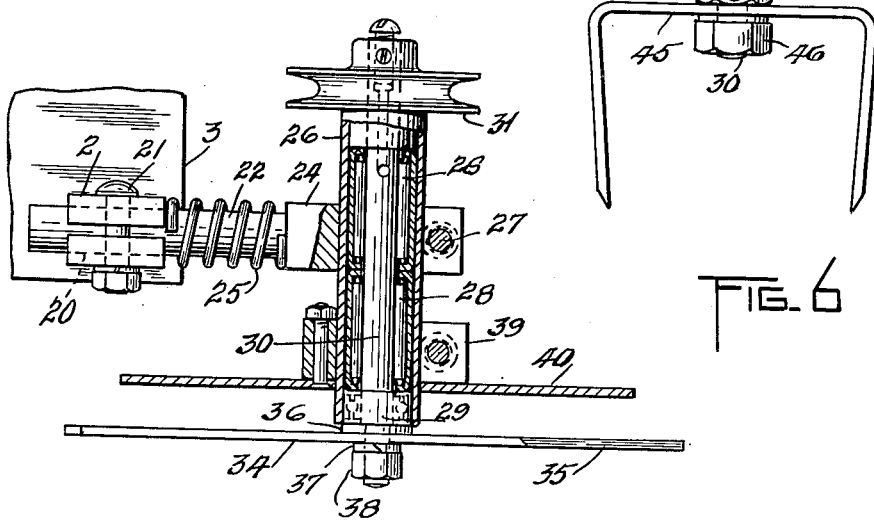

Patented June 15, 1954

2,680,945

UNITED STATES PATENT OFFICE 2,680,945

COMBINED MOWER AND TRIMMER

John N. Reed, Miami Shores, Fla.

Application July 21, 1950, Serial No. 175,073

3 Claims. (Cl. 56—25.4)

The present invention relates to a lawn and garden implement of the mower type, one of the objects thereof being the provision of a sturdy machine of this character comprising but few parts and which may be used for many and various purposes.

Briefly stated, a machine constructed in accordance with this invention includes a low slung base plate or supporting frame so designed as to be reversible, whereby when the parts are assembled the machine will be right or left handed, as desired; a pair of ground engaging wheels, one on each side of the frame but arranged one in advance of each other for the purpose of permitting use of a smaller frame than would otherwise be necessary in obtaining a proper balancing and maximum efficiency of the machine; a third wheel centrally disposed in relation to the other two and in rear of the supporting frame, it being another object of the invention to so adjustably mount this third wheel that it will engage the ground when the cutting member rotates about a vertical axis and maintain the supporting frame either parallel to or at a predetermined angle to the ground level and, further, to lift the wheel from the ground and employ it as a counterbalance when the cutting member rotates about a horizontal axis.

The invention further embodies and has for another object the provision of a single whirl-type blade as the cutting element and to so mount the blade that it may be readily adjustable to rotate about a vertical axis for cutting grass and trimming purposes, and about a horizontal axis when functioning as an edger along side walks and the like.

In addition the invention contemplates, and has for another of its objects, the use of a guard plate so formed and arranged with respect to the cutting blade as to function as a line guide in both trimming and edging operations.

A still further object of the invention is to make the cutting blade removable so that another type of tool, such as a scuttler, may be substituted and the implement employed as a cultivator and for weeding gardens.

To these and other ends, the invention consists of certain parts and combinations of parts as will be more fully set forth in the following description and particularly defined in the appended claims.

The accompanying drawings illustrating a preferred embodiment of the invention and forming a part of the specifications are as follows:

Fig. 1 is a plan view of the machine with the cutting blade in position for rotation in a horizontal plane. In this view only a fragmentary portion of the motor is shown.

Fig. 2 is a side elevation of the machine as seen in Fig. 1.

Fig. 3 is an edge view from the right, with respect to Figs. 1 and 2, of the base plate upon which the motor and cutter supporting members are mounted.

Fig. 4 is a side view similar to Fig. 2 but showing the cutting tool in position for rotation in a vertical plane and with the rear wheel raised from the ground.

Fig. 5 is an enlarged fragmentary view, partly in plan, and partly in longitudinal section, of the motor driven parts and their mounting.

Fig. 6 is an enlarged fragmentary detail illustrating a different type of cutting tool from that seen in Figs. 1, 2, 4 and 5.

In the drawings, similar reference numerals refer to similar parts throughout the several views.

The motor 1, in this instance shown as a standard type of reciprocating gas engine, and an upstanding split bearing block 2, are mounted upon a supporting frame comprising a base plate 3 to the underside of which two axles 4 and 5 are rigidly secured by bolts 6 or other suitable fastening means. Preferably, bolts 6 are used for the reason that the machine will be right or left hand accordingly as the face shown of the plate 3, or its underface is placed uppermost. These axles 4 and 5 extend outward from opposite side edges of plate 3 and are journalled in the antifriction bearings of wheels 7 and 8, respectively, which are preferably rubber tired, as shown. The axles 4 and 5, although parallel, are out of alignment with each other so that the wheel, in this instance 8, on the side of the machine opposite that to which the bearing block 2 is attached will be advanced slightly beyond that of the other wheel. This arrangement of the wheels 7 and 8 and the fact that the side of plate 3 adjacent wheel 7 and directly in rear of the bearing block 2 is cut back a distance substantially equal to the width of the wheel, permits the use of a smaller frame plate 3 than would otherwise be necessary in obtaining a proper balancing and maximum efficiency of the machine, besides making it more easy to maneuver.

A centrally disposed ground engaging rear wheel 9, similar to wheels 7 and 8, is mounted to freely rotate on a stub-shaft 10 extending laterally from the outer end of an arm 11 which, adjacent its inner end is fulcrumed on a stud 12 rotatably adjustable in the split outer end of a bar 13 rigidly attached to and extending rearwardly from plate 3. Stud 12 has a head 14 into which is threaded the lower end of a control rod or handle 15 which at its upper end is provided with a hand grip 16, the handle normally lying in a vertical plane at any desired position of angular adjustment in which it is retained by tightening a clamping bolt 17 in the bar 13. A bolt 19 extends laterally through bar 13 and an arcial slot 18 in the pivoted arm 11, in advance of pivotal connection 12. Bolt 19 permits an angular adjustment of the arm 11 relative to the supporting plate 3.

The split bearing block 2 stands upright from the lower right hand corner of plate 3, with respect to Fig. 1, and has a bore 20 substantially in line with the center, circumferentially, of wheel 7. Extending through this bore, and held in a desired position of axial adjustment by tightening a clamping bolt 21 in block 2, is the reduced horizontally extending cylindrical shank 22 of a bearing block 24, while surrounding the shank 22 and interposed between the block members 2 and 24 is a thrust sustaining compression spring 25.

Block 24 has a bore for slidably receiving a tubular sleeve 26 which is held in position of axial adjustment at right angles to its supporting members 22—24 by the tightening of clamping bolt 27 in the part 24. Journalled in the sleeve 26, on roller bearings 28, and a radial thrust bearing 29 is a shaft 30. This shaft 30 extends beyond both ends of the sleeve and has a grooved pulley 31 fixed to its upper or inner end, with respect to the drawings, which is driven by a belt 23 from a similar pulley 32 on shaft 33 of the engine 1. And, fitted to the reduced lower or outer end of shaft 30, as shown in Figs. 1 through 5, is a cutting tool in the form of an elongated flat blade 34, opposite end portions of the opposing side edges of the blade 34 being ground to form knife edges 35. This blade 34 rotates with shaft 30 and is held in place between thrust washers 36 and 37 by a retaining nut 38 threaded on the shaft.

Clamped to sleeve 26 intermediate its support 24 and the blade 34 is a split block 39. Integral with this block 39 and in parallel relation to blade 34 is a disc 40 providing a guard or cover plate for the cutter blade 34 and from which a segmental portion is removed, one of the angularly disposed edges 50, thus formed on the disc 40 functioning as a line guide when trimming grass along the edges of sidewalks and the like. Removably secured to the disc 40 by screws 41 is another plate member 42 having a semi-circular depending flange 43 providing a guard for the blade 34 when the latter rotates offside from frame 3 and wheel 7, as in Figs. 1 and 2, and when rotating in a vertical plane, as in Fig. 4. On the inner face of disc 40 is a roller 44 for the purpose later to be described.

Operation

Assuming that blade 34 is set to rotate in a horizontal plane about a vertical axis, as in Figs. 1 and 2, driving connection with the engine 1 will be made through belt 23 which, in this instance, is given a quarter turn and engages the drive and driven pulleys 32 and 31, respectively, rotation of the blade being in the direction indicated by the arrow in Fig. 1. Thus, the implement becomes a lawn-mower, manually propelled and with all three wheels 7, 8 and 9 engaging the ground. More specifically, however, the machine as thus adjusted is intended for use in trimming grass along sidewalks, flower beds, around trees and along walls and fences. It will trim neatly around small posts, cut grass under a fence spaced as low as two inches from the ground, and is particularly adaptable in cutting grass and weeds under hedges and bushes. Axial adjustment of the sleeve 26 in its supporting member 24 determines the depth of cut, and when trimming along a slight slope, as off the edge of a raised sidewalk, with the wheels on a level surface, an even cut will be assured by adjusting the shank 22 in the block 2 so that the axis of the cutter will be at right angles to the slope.

With the parts adjusted so that the blade 34 will rotate in a vertical plane about a horizontal axis, as in Fig. 4, the machine is used for edging, that is, cutting a narrow trench along the edges of sidewalks, and around flower beds, trees and like places. In this instance, rear wheel 9 is raised from the ground and functions as a counterbalance. Disc 40 acts as a guide by engaging the inner face of the trench. Roller 44, extending laterally from the inner face of the guide member 40, engages the walk or ground surface along the trench, thus limiting the depth of a cut, while its width is determined by the space between the disc 40 and cutter 34 which are relatively adjustable.

Particularly important features of the invention reside in its simplicity of construction and arrangement of parts. The axially and rotatably adjustable supporting member 22 rigidly mounted and projecting forward of the base plate 3 carries with it the cutting blade and all associated parts which, with the adjustable sleeve 26, includes shaft 30 housed within the sleeve, disc 40 and guard 42 rotatably adjustable on the sleeve and axially adjustable relatively to the cutting blade 34, and the pulley 31. By mounting the supporting member 22 adjacent one of the forward corners of base plate 3 with its axle substantially in line with the adjacent ground wheel 7, the blade is positioned to operate not only in advance of the base plate but off side from the base and wheel 7 when rotating about either a horizontal or a vertical axis, or at any angle in between the horizontal and vertical. Thus, in one instance, the blade may be used as an edger not only along sidewalks and around trees and flower beds, but close to a building wall with the outer edge of flange 43 on the guard or shield 42 functioning as a line guide or spacer. In the other instance, with blade 34 horizontal and used as a trimmer, the machine will cut close to a wall or the edge of a flower bed with flange 43 again performing the dual functions of line guide and shield.

By substituting a scuttling type of tool, such as illustrated at 45, Fig. 6, for the blade 34, the machine may be used in a garden as a cultivator and for weeding, a nut 46 threaded on shaft 30 being the means for locking the tool in place so as to turn with the shaft.

It will readily be observed that the machine will be right or left hand, according to which face of base plate 3 is placed uppermost. Also, the machine may be made left hand by placing the bearing block 2 at the upper right hand corner of plate 3, Fig. 1, in which event holding screws for the block 2 would be passed through the holes indicated at 47.

From the foregoing, it is believed that the construction, operation and various uses of the improved lawn and garden implement have been made sufficiently clear as to call for no further explanation. It may be stated, however, that in the event of the bearing block 2 being located in the position designated by bolt openings 47, the drive pulley 32 would be on the opposite side of the motor from that in which it is shown in the drawings.

I claim:

1. In a lawn and garden implement for the purposes set forth, a horizontally disposed plate providing a frame, a pair of ground engaging wheels, one at each side of said frame and upon which the frame is tiltably mounted, a fixed post upstanding from said frame in front of one of said wheels and having a horizontal bore substantially in alignment with such wheel, a support comprising a shank and a head portion, the latter having a bore at right angles to the shank, said shank being mounted in the bore of said post for rotary and axial adjustment, means for holding said shank in adjusted position, a sleeve axially adjustable in the bore of said head portion and means for holding the sleeve in position of adjustment; a shaft revolvable in said sleeve, a pulley on one end of said shaft and a cutting blade on the opposite end, a motor supported on said frame, a driving connection from the motor to said pulley, a guard axially and rotatably adjustable on said sleeve; a rearward extension from said frame, a ground engaging third wheel mounted on said extension, and an upwardly extending angularly disposed handle bar having adjustable pivotal connection at its lower end to said rearward extension at a point intermediate the frame and said third wheel, said third wheel being raised from the ground and functioning as a counter balance when the implement is operated with said frame in a tilted position.

2. A lawn and garden implement in accordance with claim 1 but characterized by said guard including a disc portion parallel with said cutting blade and having a segmental portion cut therefrom.

3. A lawn and garden implement in accordance with claim 1 but characterized by said rearward extension including a fixed part, a stud in said fixed part, and an arm pivoted intermediate its ends on said stud, by said handle bar being angularly adjustable on said stud, by said third wheel being mounted on the outer end of said arm, and by the inner end of said arm being clamped in position of angular adjustment to said fixed part.

References Cited in the file of this patent

UNITED STATES PATENTS

| Number | Name | Date |
|---|---|---|
| Re. 21,274 | Orr | Nov. 21, 1939 |
| 1,189,519 | Word | July 4, 1916 |
| 2,139,353 | Bruder | Dec. 6, 1938 |
| 2,171,750 | Hooe | Sept. 5, 1939 |
| 2,200,368 | Iverson | May 14, 1940 |
| 2,310,152 | Ronning | Feb. 2, 1943 |
| 2,365,408 | Hillyer | Dec. 19, 1944 |
| 2,410,196 | Benthall, Sr. | Oct. 29, 1946 |
| 2,439,607 | Irwin | Apr. 13, 1948 |
| 2,480,922 | Harshman | Sept. 6, 1949 |
| 2,485,984 | Newman | Oct. 25, 1949 |
| 2,515,732 | Parry | July 18, 1950 |
| 2,518,093 | Sutter | Aug. 8, 1950 |
| 2,521,033 | Bell | Sept. 5, 1950 |
| 2,529,870 | Golasky | Nov. 14, 1950 |
| 2,538,230 | Boggs | Jan. 16, 1951 |
| 2,564,201 | Hainke | Aug. 14, 1951 |
| 2,618,919 | Hutchens | Nov. 25, 1952 |

OTHER REFERENCES

Popular Science, April 1950, page 116.